(12) United States Patent
Edwards

(10) Patent No.: US 9,743,010 B1
(45) Date of Patent: Aug. 22, 2017

(54) SYNCHRONIZED LIGHTING AND VIDEO ACTIVE LIGHTING TRACKS (VALT) WITH SYNCHRONIZED CAMERA TO ENABLE MULTI-SCHEME MOTION PICTURE CAPTURE

(71) Applicant: Charles Edwards, Pleasanton, CA (US)

(72) Inventor: Charles Edwards, Pleasanton, CA (US)

(73) Assignee: Cineo Lighting Inc., Half Moon Bay, CA (US)

( * ) Notice: Subject to any disclaimer, the term of this patent is extended or adjusted under 35 U.S.C. 154(b) by 0 days.

(21) Appl. No.: 15/061,893

(22) Filed: Mar. 4, 2016

Related U.S. Application Data

(60) Provisional application No. 62/128,392, filed on Mar. 4, 2015, provisional application No. 62/264,673, filed on Dec. 8, 2015.

(51) Int. Cl.
*H04N 5/235* (2006.01)

(52) U.S. Cl.
CPC .................. *H04N 5/2352* (2013.01)

(58) Field of Classification Search
CPC .............. G03B 15/02–15/05; G03B 2215/05–2215/0596; H04N 5/2352; H04N 5/2354; H04N 5/2256; G06K 2209/401; F21K 5/023–5/026
See application file for complete search history.

(56) References Cited

U.S. PATENT DOCUMENTS

| | | | |
|---|---|---|---|
| 6,545,742 B2 | 4/2003 | O'Hagan | |
| 7,916,995 B2 | 3/2011 | Haupt et al. | |
| 9,001,226 B1* | 4/2015 | Ng | H04N 5/23203 348/211.11 |
| 2006/0007346 A1* | 1/2006 | Nakamura | H04N 5/2354 348/362 |
| 2006/0232825 A1* | 10/2006 | Freyman | H04N 5/2354 358/296 |

(Continued)

OTHER PUBLICATIONS

Havran, et al., "Interactive System for Dynamic Scene Lighting Using Captured Video Environment Maps", Eurographics Symposium on Rendering, 2005, 1-13.

(Continued)

*Primary Examiner* — Jason Flohre
(74) *Attorney, Agent, or Firm* — Michael T. Wallace

(57) ABSTRACT

A method and system for synchronizing LED lighting to the shutters of fast digital cameras. The system enables capture of multiple lighting schemes to be filmed in a single video take on sequential frames. Since 24 frames per second is the industry standard used broadly in film and television, a 96 FPS camera can capture up to 4 lighting tracks of 24 FPS each in a single take. Each lighting fixture can be changed frame by frame to any desired intensity. The changing of lighting can be synchronized with the times when the shutter is closed so that all frames are complete and are without the visual artifact of the light changing mid frame. This is extremely useful for simple visual effects such as a simulated camera flash, lighting pattern or gun flash. The lighting can be programmed so that by turning on lights at the appropriate intensity while the camera shutters are closed all viewers on set perceive a constant, flicker-free light. The entire system is compatible with existing industry standards.

2 Claims, 8 Drawing Sheets

(56) References Cited

U.S. PATENT DOCUMENTS

| | | | |
|---|---|---|---|
| 2007/0139525 A1 | 6/2007 | Amphlett | |
| 2011/0085025 A1 | 4/2011 | Pace et al. | |
| 2011/0242334 A1 | 10/2011 | Wilburn et al. | |
| 2011/0260059 A1* | 10/2011 | Jiang | H04N 5/2256 250/330 |
| 2013/0120636 A1* | 5/2013 | Baer | H04N 5/2354 348/335 |
| 2013/0176481 A1 | 7/2013 | Holmes et al. | |
| 2013/0235203 A1* | 9/2013 | Billington | H04N 5/2354 348/148 |
| 2014/0198219 A1 | 7/2014 | Chuang et al. | |
| 2014/0313401 A1 | 10/2014 | Rihn et al. | |
| 2015/0062863 A1* | 3/2015 | Libreri | H04N 5/2356 362/11 |
| 2015/0097928 A1 | 4/2015 | Junuzovic et al. | |

OTHER PUBLICATIONS

Leite De Barros, et al., "A Method to Synchronise Video Cameras Using the Audio Band", Journal of Biomechanics,, Dec. 25, 2004, 1-5.

Theobalt, "A Flexible and Versatile Studio for Synchronized Multi-view Video Recording", Vision, Video, and Graphics, 2003, 9-16.

* cited by examiner

FIG. 5

| Shutter State | FRAME 1 | | | | | | | | | | | | FRAME 2.... | | | | | | | | | | | | |
|---|---|---|---|---|---|---|---|---|---|---|---|---|---|---|---|---|---|---|---|---|---|---|---|---|---|
| | 180° Degree Shutter 4 Video Tracks at 24 FPS (= 41.66msec) | | | | | | | | | | | | 180° Degree Shutter 4 Video Tracks at 24 FPS (= 41.66msec) | | | | | | | | | | | | |
| | Track 1 - 96FPS (10.4ms) | | | | Track 2 - 96FPS (10.4ms) | | | | Track 3 - 96FPS (10.4ms) | | | | Track 4 - 96FPS (10.4ms) | | | | Track 1 - 96FPS (10.4ms) | | | | Track 2 - 96FPS (10.4ms) | | | | Track 3 - 96FPS (10.4ms) | | | | Track 4 - 96FPS (10.4ms) |
| | Open Camera (5.2ms) | | Close Eye (5.2ms) | | Open Camera (5.2ms) | | Close Eye (5.2ms) | | Open Camera (5.2ms) | | Close Eye (5.2ms) | | Open Camera (5.2ms) | | Close Eye (5.2ms) | | Open Camera (5.2ms) | | Close Eye (5.2ms) | | Open Camera (5.2ms) | | Close Eye (5.2ms) | | Open Camera (5.2ms) | | Close Eye (5.2ms) | | Open Camera (5.2ms) | | Close Eye (5.2ms) |
| Light 1 | 100% | | 0% | | 0% | | 100% | | 0% | | 100% | | 0% | | 100% | | 100% | | 0% | | 0% | | 100% | | 0% | | 100% | | 0% | | 100% |
| Visual Appearance | | | 50% | | | | 50% | | | | 50% | | | | 50% | | | | 50% | | | | 50% | | | | 50% | | | | 50% |
| Light 2 | 0% | | 100% | | 100% | | 0% | | 100% | | 0% | | 100% | | 0% | | 0% | | 100% | | 100% | | 0% | | 100% | | 0% | | 100% | | 0% |
| Visual Appearance | | | 50% | | | | 50% | | | | 50% | | | | 50% | | | | 50% | | | | 50% | | | | 50% | | | | 50% |
| Light 3 | 45% | | 55% | | 0% | | 100% | | 30% | | 70% | | 60% | | 40% | | 45% | | 55% | | 0% | | 100% | | 30% | | 70% | | 60% | | 40% |
| Visual Appearance | | | 50% | | | | 50% | | | | 50% | | | | 50% | | | | 50% | | | | 50% | | | | 50% | | | | 50% |
| Light 4 | 25% | | 75% | | 100% | | 0% | | 10% | | 90% | | 40% | | 60% | | 25% | | 75% | | 100% | | 0% | | 10% | | 90% | | 40% | | 60% |
| Visual Appearance | | | 50% | | | | 50% | | | | 50% | | | | 50% | | | | 50% | | | | 50% | | | | 50% | | | | 50% |

FIG. 6

| TRACK 1 - Light 1, Uncompensated | | | | |
|---|---|---|---|---|
| Light States | 1 | 2 | 3 | 4 |
| Shutter State | Open 5.2ms | Change Visual 1ms | Closed 5.2ms | Change Camera 1ms |
| | | | Visual Compensate 3.2ms | |
| Function | Camera Image Capture | | | |
| No Compensation Worst Case | 100% | 100-0% | 0% | 0-100% |
| Visual Avg/State | 100% | 50% | 0% | 50% |
| Visual Avg ON/OFF | 100% | | 19% | |
| Visual Avg Track 1 | 59.6% | | | |

| TRACK 1 - Light 1, Compensated | | | | |
|---|---|---|---|---|
| Light States | 1 | 2 | 3 | 4 |
| Shutter State | Open 5.2ms | Change Visual 1ms | Closed 5.2ms | Change Camera 1ms |
| | | | Visual Compensate 3.2ms | |
| Function | Camera Image Capture | | | |
| With compensation | 100% Compensated (= 81% of Maximum Light Output) | 100-0% | 0% | 0-100% |
| Visual Avg/State | 81% | 50% | 0% | 50% |
| Visual Avg ON/OFF | 81% | | 19% | |
| Visual Avg Track 1 | 50% | | | |

M = Maximum light output in lumens*seconds (lms Sec)
C = Compensated Maximum light output used for Image Capture
XON = Light output during transition of 0% to 100% in lms sec
XOFF = Light output during transition of 100% to 0% in lms sec

C = M - (XON + XOFF)

In this example C is estimated as 100%-19% = 81%

SYNCHRONIZED LIGHTING AND VIDEO ACTIVE LIGHTING TRACKS (VALT) WITH SYNCHRONIZED CAMERA TO ENABLE MULTI-SCHEME MOTION PICTURE CAPTURE

CROSS-REFERENCE TO RELATED APPLICATIONS

This application claims priority to and the benefit of the filing of U.S. Provisional Patent Application Ser. No. 62/128,392, entitled "Active Lighting With Synchronized Camera to Enable Multi-Scheme Motion Picture Capture", filed on Mar. 4, 2015 and U.S. Provisional Patent Application Ser. No. 62/264,673, entitled "Video Active Lighting Tracks (VALT) With Synchronized Camera to Enable Multi-Scheme Motion Picture Capture", filed on Dec. 8, 2015, and the specification and claims thereof are incorporated herein by reference.

BACKGROUND OF THE INVENTION

Field of the Invention (Technical Field)

The present invention is related to synchronization of changes in lighting to the camera shutter for videos and motion pictures. This enables all lighting transitions to be done between frames making the resulting frame image capture clean and free from artifacts that occur when lighting changes occur in the middle of a frame.

BACKGROUND ART

Note that the following discussion may refer to a number of publications and references. Discussion of such publications herein is given for more complete background of the scientific principles and is not to be construed as an admission that such publications are prior art for patentability determination purposes.

SUMMARY OF THE INVENTION (DISCLOSURE OF THE INVENTION)

The present invention is a method for making a digital video, the method comprising synchronizing one or more light emitting diode (LED) light fixtures to the shutters of one or more digital cameras, and changing an intensity of the one or more lights while the shutter on each of the one or more cameras is closed. Each of the light fixtures can preferably transition between on and off in less than approximately 5 milliseconds, and more preferably in less than approximately 2 milliseconds. The method preferably comprises programming the intensity value of each of the light fixtures prior to the changing step. The method preferably further comprises defining a plurality of n lighting schemes, each scheme comprising desired intensities of the one or more light fixtures; switching the lighting fixtures sequentially between the lighting schemes in synchronization with the camera shutters at a rate equal to the frame capture rate of the cameras divided by n; and the cameras capturing the plurality of lighting schemes on interleaved video frames during a single video take, wherein every $n^{th}$ video frame captures a scene comprising the $n^{th}$ lighting scheme; wherein each camera is capable of capturing at least 47 frames per second (FPS). The light fixtures are preferably dimmable. The method optionally comprises turning on one or more of the lighting fixtures at a predetermined intensity while the camera shutters are closed so that personnel on set perceive light that is constantly on and flicker free. Each of the lighting fixtures can preferably provide a pulse of light having a duration of less than or equal to approximately 110 milliseconds. The time in each camera cycle when the shutter is open is preferably reduced so there is sufficient time when the shutter is closed to accommodate a lighting transition from the intensity of the lighting while the shutter is open, an anti-flicker lighting pulse, and a lighting transition to the intensity of the lighting when the shutter is next open. The method optionally comprises compensating for lighting transition times by adjusting the maximum light levels. Each camera preferably separates the plurality of lighting schemes into a plurality of video streams, each video stream comprising a single lighting scheme. Each video stream can preferably be viewed separately during filming. The synchronization step is preferably performed using a GPS signal to provide master synchronization for the lighting fixtures and the cameras. Each lighting fixture preferably comprises a GPS receiver and preferably reports its location and operational status. Each lighting fixture preferably comprises an internal clock correlated with the time reported by the GPS receiver that enables continued synchronization to occur when a GPS signal is intermittent or temporarily unavailable.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures:

FIG. 5 is a table showing a calculation of light intensities to provide anti-flicker compensation for a simple 4 track/4 light VALT setup in accordance with the present invention.

FIG. 6 is a table showing one example of producing 100% light level compensation for LED transition adjustment assuming a constant 180 degree shutter angle.

DETAILED DESCRIPTION OF EMBODIMENTS OF THE INVENTION

Motion picture technology is rapidly changing with the advent of hi resolution digital video capture. Digital cameras now offer similar image quality as traditional film with equal and even improved resolution. Digital cameras have also reduced the required exposure times and the light required, thus enabling higher frame rates of video capture with high quality using less light than previously needed by film. A second new technology, LED lighting, is also rapidly being adopted as a replacement for conventional Tungsten, HMI and other motion picture light sources. LED has several benefits as a motion picture light source including lower power consumption, 0-100% dimming capable, digital color control, and effectively instant on/off response times (measured in nanoseconds). As a semiconductor device, LEDs lend themselves toward digital control. The present invention is a new type of motion picture control system that utilizes synchronized control of both high speed digital motion picture cameras and digital LED lighting systems to enable multiple "lighting schemes" to be filmed simultaneously. In some embodiments the changing of lighting can be synchronized with the times when the shutter is closed so that all frames are complete and are without the visual artifact of the light changing mid frame. This is extremely useful for simple visual effects such as a simulated camera flash, lighting pattern or gun flash. Often these effects occur in a single frame or a short burst of carefully planned frames at specific light levels. Embodiments of the present invention synchronize lighting events with the camera shutter so even with simple single track video capture this invention can be beneficial.

Figure 1:
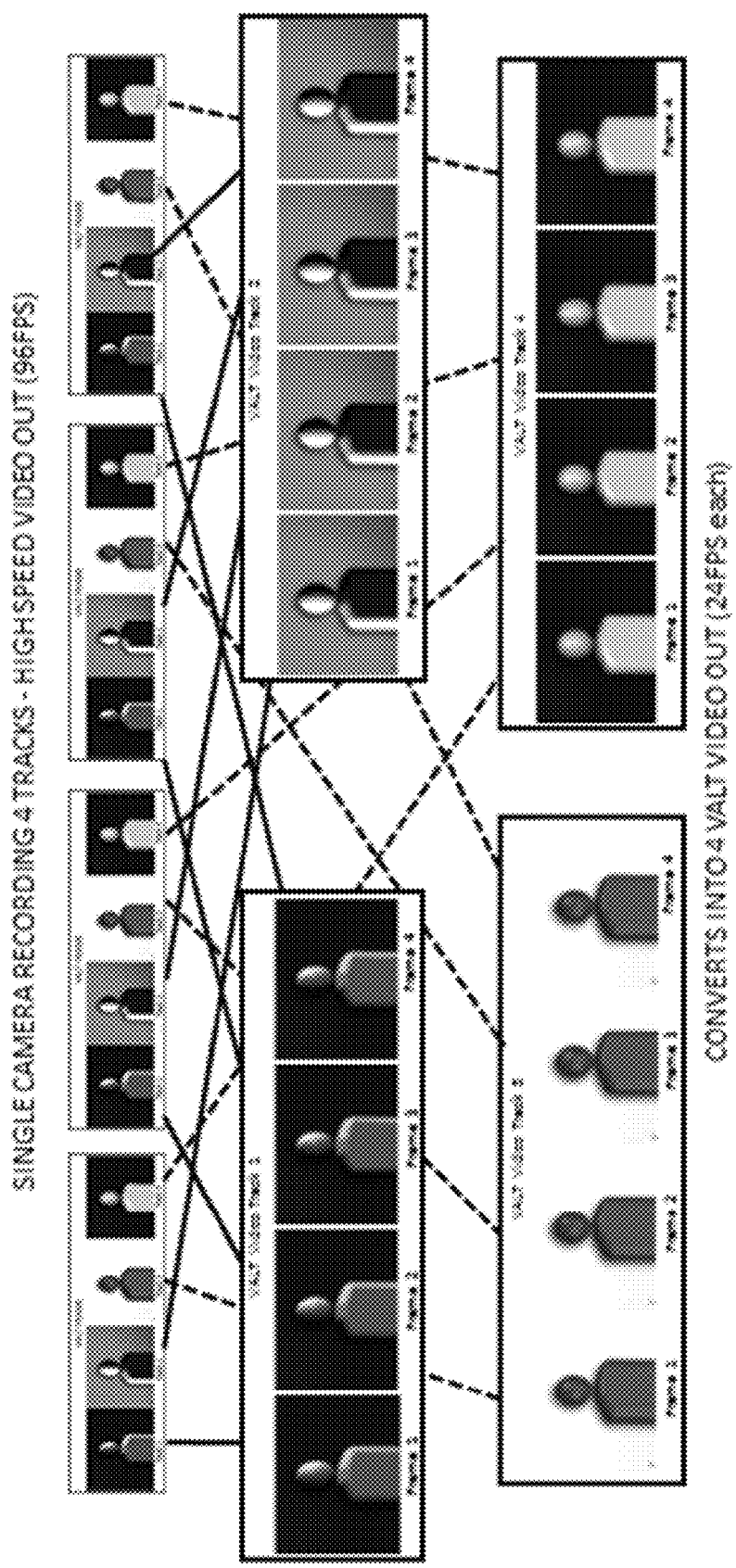
FIG. 1 shows a schematic of a 96 FPS camera capturing 4 VALT tracks of 24 FPS each in a single take.

Embodiments of the present invention use high speed video to capture multiple lighting treatments of the same scene at the same time, which is called Video Active Lighting Tracks (VALT) herein. The concept is similar to audio tracks where different parts of the overall sound are captured separately during the recording. In VALT high speed video photography is synchronized with high speed lighting to film the same sequence with 4 or more distinct lighting settings or schemes, called tracks, filmed simultaneously. The lighting settings can switch at very high speeds, synchronized with high speed cameras (96 frames per second (FPS) or higher). Since 24 frames per second is the industry standard used broadly in film and television, a 96 FPS camera can capture up to 4 VALT tracks of 24 FPS each in a single take. A schematic of this is shown in FIG. 1.

Embodiments of the present invention solve problems with existing systems, such as visual flicker (also called strobing). If lighting changes are made at 24 FPS they are visible to the human eye. Without an advanced method for flicker compensation, filming multiple lighting tracks simultaneously with different light levels in each track will result in a very noticeable flicker. This creates an unworkable environment on set. It is visually very uncomfortable and dangerous for people predisposed to epilepsy. The present system also supports visual set up and previewing of individual lighting tracks so that the Director of Photography and crew have the ability to see the lighting setup in real time and manually adjust and preview each VALT track individually. The setup and use of VALT lighting is consistent and seamless with the current artistic and highly interactive process of setting up a scene for lighting. The present system also supports full dimming adjustment (i.e. from 0-100%) for each light separately for each track. In previous systems each light runs on a fixed strobe rate, only on and off, thus requiring separate lights for each track. This is not useful in a film or television studio where complete freedom is needed to adjust the dim level of each light separately and differently for each track. The present system preferably supports full, independent lighting adjustment just as is done today with standard single track filming. The present system also preferably supports seamless active previewing of all tracks in real time during filming and playback without the need for any post processing to view the individual video tracks. Many inventions using active lighting assume post processing will be required. Furthermore, the present system is compatible with industry standards and existing hardware, such as existing protocols and hardware used to control lighting (DMX, RDM) and for synchronizing digital cameras and camera locations (SMPTE). Thus, embodiments of the present invention not only enable multi-track video image capture but also comprise anti-flicker compensation for uniform visual light output; interactive, individual track lighting setup modes; fully independent, 0-100% dimming control for each light and each track; real time video previewing and replay of all individual tracks; and DMX/RDM compatibility for lighting controls and SMPTE compatibility for synchronization.

Synchronizing lighting enables lighting effects to be synchronized across multiple lights to coincide with the same frame captured by the camera. This is especially useful for flash and other burst and high speed lighting transitions that will leave artifacts if made mid frame. In addition to synchronized lighting transitions this invention supports a more advance implementation of Video Active Lighting Tracks (VALT) where the user can set up multiple "lighting schemes" in advance of shooting. When the scene is filmed, multiple lighting schemes can be captured simultaneously, allowing the cinematographer to create 2, 3, 4, 8, or more different video renderings of the same scene, in a single video take, using a single camera. Multiple cameras may alternatively be used under this invention. All "active lights" on the set preferably comprise digital LED lights that are networked together and support the command structure for multi-scheme lighting. (DMX or RDM networks are a preferred standard for film and studio systems.) The network is used to communicate the multi-scheme system commands to all lights (and optionally additional smart cameras) on the network. A digital camera is used that preferably comprises at least a synch signal that can be shared across the network that synchronizes the "lighting schemes" with the frame capture of the camera. There are several industry standard genlock sync signals that are already used for camera syncing that can be used for this invention as the synchronization signal, such as Black Burst, Tri-Level Sync and SD sync. However, these signals have not been used in the past to sync lighting transitions to camera shutter. In one embodiment of the present invention the active lighting is synchronized to the camera shutter, so a special effect such as a gun shot flash can be synchronized with the exact time pulse when the camera shutter is open. This ensures the lighting event is captured cleanly on camera in that specific frame. It also ensures if multiple lights are used that they all flash at the same time. For regular single track filming this is a significant benefit. In other embodiments that use high speed video capture, the synchronized "active lights" sequentially change "lighting schemes" with each frame capture. SMPTE (Society of Motion Picture and Television Engineers) has established frame synchronizing standards that can be used for this embodiment. When using high speed video capture the result is simultaneous capture of multiple video streams, each with a different "lighting scheme".

Genlock is a synchronization technology that has been used in TV broadcast for decades. A standard synch signal (the original that is still broadly used is BlackBurst) was often connected between all monitors and cameras on the system. This insured that all cameras were capturing the same frames at the same time and all monitors are writing the images at the exact same time. Switching between cameras, filming monitors on set (like in news programs), and syncing sound track is seamless since all components on the system are using the same clock. These sync signals were very precise. They had a vertical sync pulse that insured each frame started at the same time, then a more precise horizontal sync pulse that synchronized the writing of each raster line of pixels. However, these sync signals were never used with lighting. More recently, industry sync technology has been augmented to include SD and HD sync signals that are higher resolution. Movies are also using sync signals combined with digital cameras to synchronize multiple cameras, sound equipment and even special effects and camera location that are used in post-production. However, lighting systems have not been synchronized, and the transition of individual lights is asynchronous.

The DMX communication standard for lighting does not include support for sync signals. In embodiments of the present invention an industry standard sync signal (Black Burst, Tri-Level, SD . . . ) is preferably fed into the lighting controller that synchronizes lighting commands. The lighting controller preferably receives the commands that control the lights (this can be thru standard DMX). Instead of changing the lights asynchronously, the controller preferably holds the commands until the next vertical frame sync pulse. The lighting transitions for each frame are preferably timed to occur during the closed shutter period prior to the frame being captured by the camera. In this way lighting is stable throughout the frame and there are preferably no asynchronous lighting events that can impact the image capture. For example, if a gun flash is to be simulated in one frame, using standard commands it is possible the flash can occur during the shutter closed time or half way between two frames. Instead of a bright flash lasting 1/24 of a second (a single frame at full brightness), the result could be two frames (lasting 2/24 of a second) which have half the level of flash or less. Using synchronized lighting the controller may in addition read a system time stamp and play a lighting "scrip" or series of commands. This allows special effects and lighting timing to be replayed perfectly, synchronized across different takes, so that in editing all lighting effects will line up perfectly at the frame level between different takes of the same scene. Time stamp data is commonly shared between cameras and audio equipment. In embodiments of the present invention time stamp data can also be utilized as an input to the lighting controller to further improve synchronization. In the present implementation of synchronized lighting there is preferably a memory that stores all DMX commands to be executed and an input synchronization signal with the lighting controller that synchronizes all lighting transitions with the camera frame capture.

In order to support eight lighting schemes with final playback speed of 24 fps, the digital camera used would need to be capable of at least 192 fps. The preferable camera would support high frame rates at high resolutions to ensure the highest quality footage. An example of a camera with such capabilities is the Red EPIC Dragon, capable of 100 fps @ 6K, 120 fps @ 5K, 150 fps @ 4K, 200 fps @ 3K, or 300 fps @ 2K. Other options include the Panasonic 4K VariCam (supports up to 240 fps at 1080p), the Blackmagic 4K Production Camera (up to 120 fps at 4K), or the Sony FS700 (up to 240 fps at 1080p).

Footage shot in the highest possible resolution—ideally 2K, 4K or greater—also provides additional creative flexibility in post-production, enabling the footage to easily be stabilized and cropped without sacrificing resolution. This adds additional framing options that could potentially be shot in just one take, enhancing the cost-effectiveness of this technology and allowing filmmakers the freedom to conserve their talent's energy with fewer takes while still adequately covering the scene.

Various "lighting schemes" can potentially be stored in a supported digital camera, allowing cinematographers to not only control active lights on set but also quickly switch between variable camera settings that affect the look of the shot, including iso, gain, exposure, and shutter angle. The ideal camera for this application has a high dynamic range (>14 stops) and offers an extensive amount of control over these settings. The RED Epic Dragon is an excellent example of this, with 16.5+ stops and manual, specified control of iso, gain, shutter angle, and white balance. If the camera were programmed to memorize multiple lighting schemes as well, the cinematographer can achieve the same look over multiple set-ups and days of shooting, and reduce the possibility of variation between takes.

Embodiments of the present invention decrease production costs by improving efficiency on set, particularly when used with multiple cameras and a lighting set-up that allows the crew freedom to shoot 360° around the subject. By syncing the cameras and lighting schemes, an actor(s) performance could be covered at several different angles with distinct lighting set ups for each in just one take. This decreases the amount of time crew spends re-lighting each set-up and minimizes stress on the director and talent by reducing the need for an extensive amount of takes.

Embodiments of the present invention synchronize different, instant, digital lighting scheme settings with the digital camera's frame capture. An accurate sync signal connecting all active lighting systems on the network to the digital camera is important. The DMX and RDM communications standards will generally not be fast enough on timing to be used for sync. However, standard DMX and RDM can be used to download the lighting settings for each track to memory inside the VALT enabled light fixtures. The synch signal may be a separate proprietary trigger signal synchronized to the shutter. Alternatively there are SMPTE standards for frame time stamping, synchronizing of digital cameras that could meet this need. It is anticipated a separate sync signal is needed, or alternatively an enhanced specification to the DMX standard that can support the higher timing requirements of frame synchronization. The benefit of an improved DMX/RDM specification is the ability to use the existing hardware infrastructure without the need for additional cabling. LED lights enable this because they can be changed using digital controls in nanoseconds, far higher than the frame rate of video capture. For film and studio applications in this invention multiple lights are networked together with digital control and memory that allows each of them to store, recall and replay the schemes setup by the cinematographer. LED lights will preferably be exclusively used as the active lights under a network controlled system. The multi-scheme control systems can be included inside each individual LED light fixture or they can be networked to an external third system which links all the lights together and coordinates the commands. The control system for each light preferably includes support of multiple commands to control each light and schemes.

Lighting setup can be changed in color temperature such that one scheme is harsher cool white is used for the purpose of having a more aggressive a darker feeling. The next scheme can be a warm light scheme with completely different feeling. In this way the cinematographer can utilize the record command to set up the sequence of lighting schemes he/she wants to record for each take.

An example application of the present invention is for when a cinematographer wants to render an action sequence or a scene that is where an actor enters the door, walks across the floor heading to a spot by a table and then walks over to a kitchen table. In each of those locations (or marks) the actor may need different lighting. This invention allows the lighting system to be setup with different schemes stored for each of the three marks such that it will highlight the correct scene, the correct look, for each situation as the actor walks through all three locations. During filming, separate video streams are recorded for each lighting scheme using this invention. The actor and crew only need to capture the sequence once. But the single camera can render the same sequence with three completely different lighting schemes. In this way the cinematographer can set up several lighting options and then film an action sequence one time and have three different lighting treatments.

Some embodiments of the present invention use commands to implement the lighting system. The SETUP command is used to setup the schemes. Using either the control panel on each light or using DMX commands, the cinematographer adjusts each light until he/she has the desired settings on all lights for the "lighting scheme". This includes the light levels, and color controls for each "active light" source on the set. Some lights will support setting of color temperature as well as dimming. Other lights may support full color (like RGB). The most critical and common setting is dimming which controls the percentage of light coming out of the fixture.

Once all lights on the network are setup at the correct settings the STORE command is issued. Multiple schemes can be stored, preferably digitally, each featuring different light levels, color controls and other settings per active LED light. This will save the settings of all lights to the same scheme location number. As an example, 0-255 scheme locations could be easily supported by DMX. Each light would have memory storage for all digital settings corresponding to each scheme. It is possible a large library of schemes can be stored and used over the entire production of a movie or other video production. In this way the same scheme settings can be shared over multiple takes, with multiple scheme options possible per take of the each video. If the camera is equipped with the store command and scheme memory then the stored settings for each scheme can be expanded to include the camera settings like gamma, ISO, color settings, shutter speed, resolutions, etc. Any digital setting available to the camera could be stored and recalled for use in each scheme. Store is preferably a system level command and all multi-scheme lighting and cameras on the system network will store the scheme when the store command is provided over the network.

Figure 2:
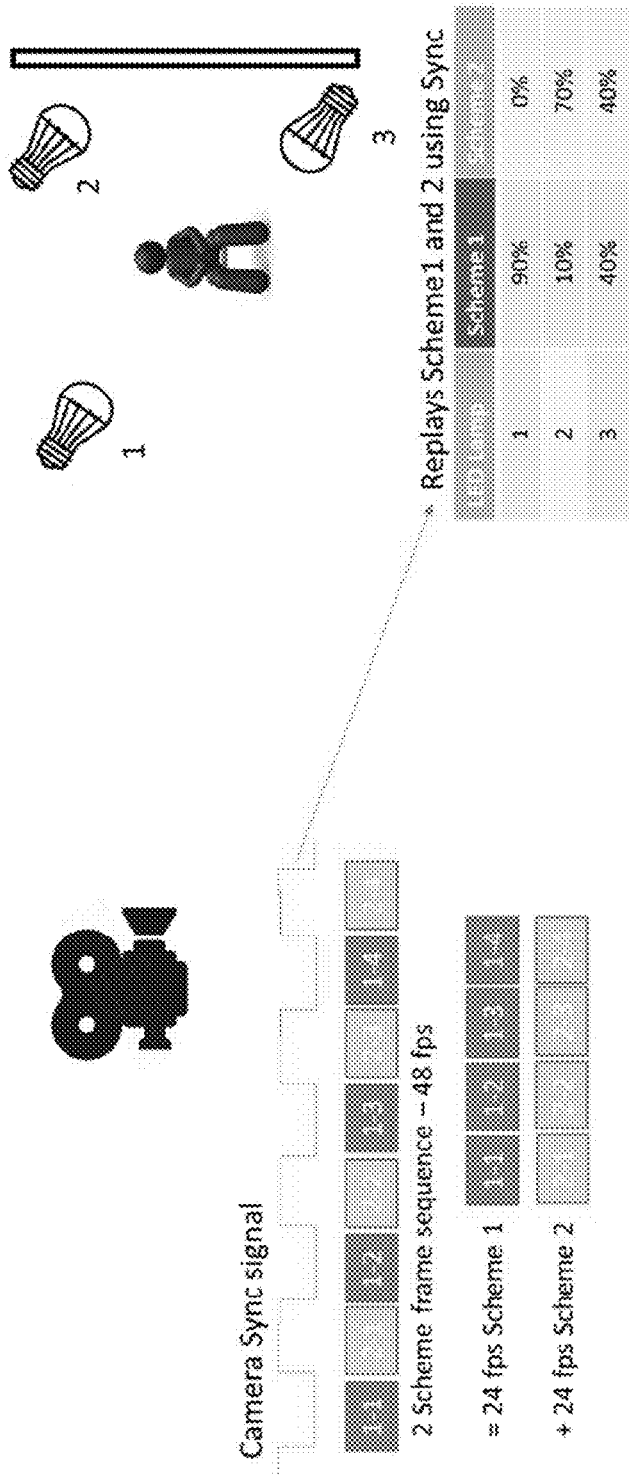
FIG. 2 shows a schematic of capturing multiple lighting schemes on sequential frames during a single video take.

In one embodiment of this invention, when the RECORD command is issued a list of schemes would also be selected by the cinematographer (1, 3, 5 for example). In that example, all lights would prepare to replay scheme 1, then 3 then 5 in sequence throughout the filming. All lights would wait for the rising edge of the sync signal to trigger turning on each scheme frame. At the falling edge the lights would all turn off. At the next rising edge all lights would turn on the next sequential scheme. Each active light in the network or system system will therefore recall the stored values for each of these schemes and replay them in order, sequentially in sync with the sync signal. When filming starts the sync signal will initialize the record sequence and all lighting will continue to sequentially replay each scheme until the sync signal stops, indicating the filming has stopped. The frames per second (fps) required is based on the number of schemes. Assuming for example a speed of 24 fps is required per scheme, filming 2 schemes requires 48 fps, 3 schemes requires 72 fps, etc. During filming each "scheme" is sequentially replayed for a single frame, being captured by the digital camera on sequential frames. The result is the same video can be digitally captured in multiple "lighting schemes" on a single camera simultaneously. A schematic depiction of this is shown in FIG. 2.

Another option for addressing multiple lighting tracks in a single light fixture is for each VALT enabled light fixture to have separate DMX addresses for each VALT track. For example if two VALT tracks are going to be recorded, the light fixture preferably utilizes two separate sets of DMX addresses. In this way the board operator could dynamically control all fixtures for each track separately and dynamically. All lights would preferably have a set of track 1 DMX addresses and a second set of track 2 addresses. On the lighting board changes to the track 1 DMX addresses would preferably dynamically change the settings for the track 1 only. The track 2 DMX addresses would preferably do the same for track 2 lighting. Two monitors would preferably be fed by the digital camera making it possible to dynamically see each track as it is being filmed so lighting adjustments and dynamic effects can be controlled and seen real time.

By separating the final frames sequentially, multiple individual videos per scheme are created. Thus multiple video renderings of the same scene are generated each using a distinct lighting scheme. This has numerous applications including significant cost savings by reducing the need for additional takes using different lighting setups, it enables numerous new lighting options and special effects, and it can significantly improve green and blue screen motion capture and introduce new methods of illuminating subjects during motion capture.

Preferably there are clean separations between lighting schemes before capturing each frame. If the lighting scheme changes mid frame this can cause artifacts and ruin the lighting setup. The separation is preferably accomplished using a combination of the following three factors:

1. Sync signal: A smart sync signal can turn on the lighting scheme with a rising edge and turn it off with a falling edge. This is preferably carefully timed with frame capture on the camera to make sure the lighting and frame capture are cleanly synchronized.
2. Shutter angle: Motion picture cameras were developed for film that was advanced between each frame. Shutter angle refers to the amount of time used by the camera to advance the film between frame captures. The original camera angle was 180 degrees which equals 50% shutter closed and 50% shutter open. The shutter angle creates a cinematic "look" and is critical to making films that look like "movies". Digital cameras have preserved this concept of shutter angle. There is a "shutter off" time in between each frame capture. This shutter off time needs to be indicated as part of the sync signal. In this solution the SYNC signal triggers the onset of the "shutter off time". This gives the lighting time to change schemes before the frame capture occurs.
3. Pulse Width: In this mode a scheme memory setting is provided to the active lighting for "pulse width". In this mode the light only stay on for the length of the pulse width setting. This would likely be a rising or falling edge trigger that fires once per frame. This method has the added advantage that it can be used for strobing action capture and also can be used to reduce the total exposure time. This is an alternate way of dimming—using frame sync'd pulse width verses reduced light levels for the full frame. A 50% pulse width time duration is equal to a 50% reduction in light level for 100% of the frame.

It is also possible to have multiple cameras filming at the same time using multi-scheme sync while the scheme sequence is being recorded. The sync master signal is preferably shared with the other cameras and the other cameras read it as a slave. The additional cameras preferably use the sync signal to synchronize their image capture with the master signal and scheme lighting systems. In this way two camera angles can be recorded of the same video sequence, each also recording the full selection of lighting schemes. If 4 schemes were selected, for example, and 2 cameras were used, then 4×2=8 video streams will be captured in a single take of the video.

Shutter Angle—"Free Space" for Transitions and Improving Appearance

Figure 3:
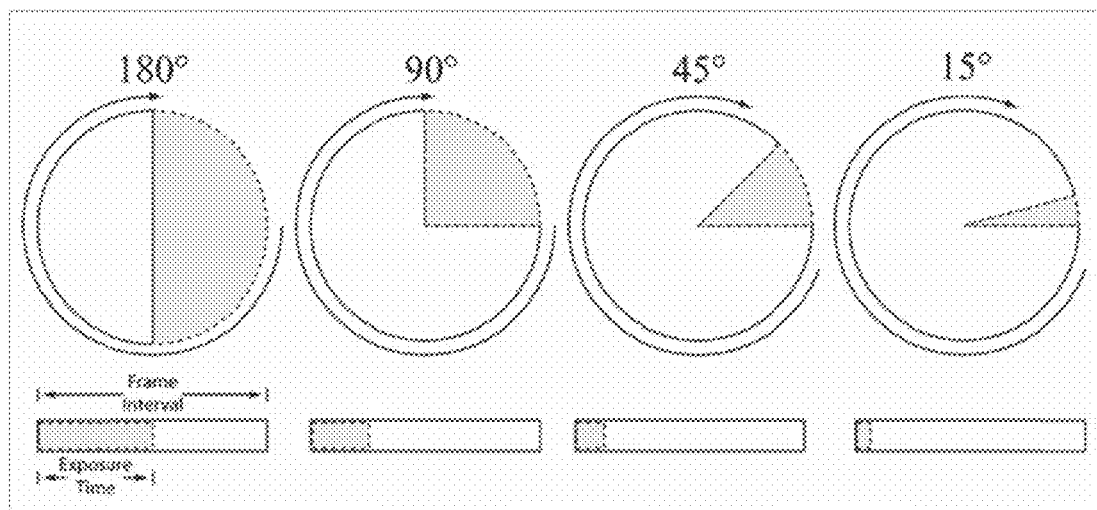
FIG. 3 is a schematic of shutter angle.

When film was used to capture movie images the "shutter angle" was the period of time that a rotating cover blocked the film so it could be moved to the next frame. Otherwise the film would have a blurred image. "Shutter angle" was typically 180 degrees (50% open, 50% closed). Therefore when a movie is filmed at 24 FPS the shutter us open for $\frac{1}{48}$ sec, then closed for $\frac{1}{48}$ sec. During the closed portion anything that happens is not seen by the camera. Some advanced cameras adopted variable shutter rates to allow better control of the exposure. New digital cameras still use the concept of shutter angle—but now it is digitally controlled. A schematic is shown in FIG. 3.

Shutter angle can be used to control transition times between lighting tracks. While the frames are being captured a constant, stable light is desirable. Therefore the transition of the frame is preferably synchronized to fall during the "shutter angle" closed time. For 4 video lighting tracks 4×24 FPS=96 FPS are captured. At a 180 degree shutter angle there will be a $\frac{1}{192}$ sec open shutter followed by $\frac{1}{192}$ sec closed. This equals 5.2 milliseconds. Since LEDs can switch in microseconds (1,000 times faster than a millisecond) the primary challenge is making the power supply and control electronics that work at these speeds. Based on the synchronization clock signal shared with the camera, the precise moment of the shutter angle close is known. The active lighting will transition to the next lighting track settings preferably during the closed shutter angle time such that the light is stable and set before the shutter opens again for the next frame capture.

Shutter angle may also be used for visual flicker control. The lighting fixtures on set have two purposes. The first is to provide carefully crafted light for the camera to allow for an optimized image to be captured. The second is to provide working light for the cast and crew on set. When traditional static lighting is used the same light is unchanged and shared for both uses. However with Video Active Lighting the lights are constantly strobing between different settings. This is especially harsh if a light is on only for 1 track and then off for the rest of the tracks. For example a green screen light may only be on for one track to capture the matte then off for the other active frames. The result will be a very noticeable and undesirable burst strobe ($\frac{1}{96}$ sec) repeating at a rate of 24 pulses per second. That is well within the 60 pulses/sec that is typically considered the threshold where pulsed light is no longer detected by the human eye. The 24 strobes/sec is visually unacceptable as a working environment.

Figure 4:
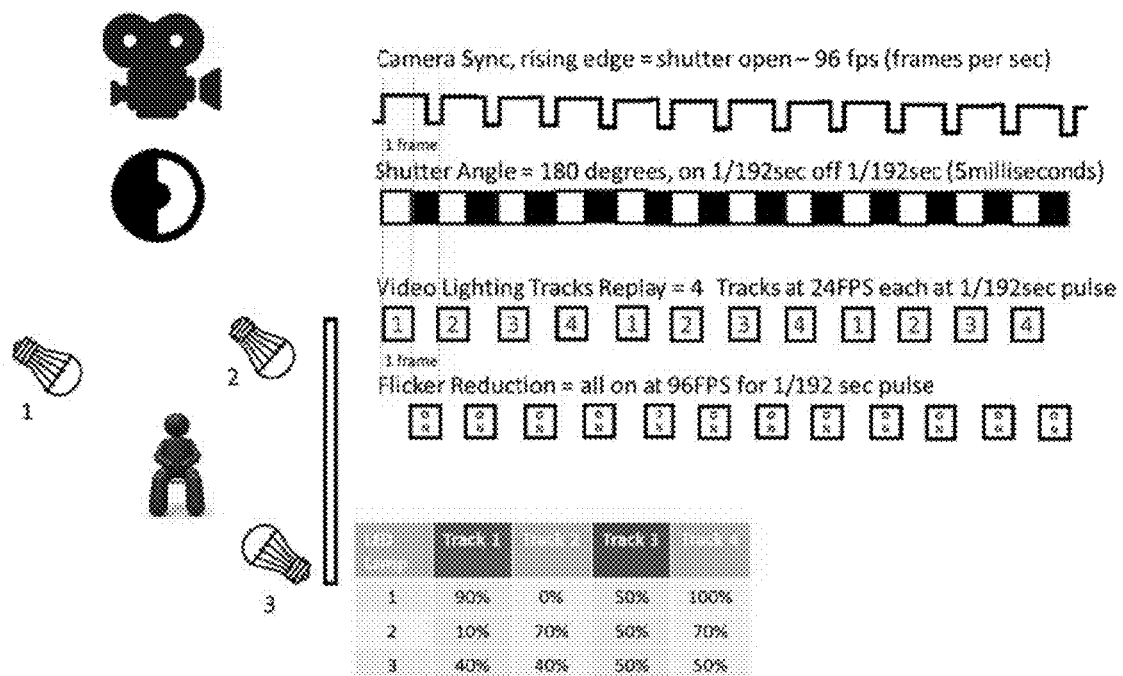
FIG. 4 shows an example of operating lights to reduce flicker.

To solve this problem, during the closed shutter time all lights will calculate (or have calculated for them) and issue a compensating light pulse that visually evens out the overall light by compensating for the light pulse in the SHUTTER ON portion, resulting in the appearance of a steady light due to the persistence of human vision. A schematic of this is shown in FIG. 4. The flicker reduction pulse is then followed by the transition to next track making sure the light has stabilized prior to the shutter opening. The result will be a very high speed pulsing "on" of the lights on set that will be at a minimum of 48 pulses/sec at 2 VALT tracks. In most cases when there are 3 or more tracks this will push the light pulses beyond the 60 pulses/sec where human vision is sensitive. The result will be that the cast and crew will perceive constantly "on" lighting on set while the camera will capture the distinct VALT settings separately for each frame. The changes in lighting for VALT will be virtually unnoticeable to the human eye.

Blue Screen/Green Screen

Embodiments of the present invention increase the versatility of green/blue screen as a creative tool for filmmakers by allowing subjects to be lit realistically or with artistic intent without concern of green "spill" or lighting for a clean key. By using multiple video renderings of the same scene, one "scheme" can be programmed to allow post production the cleanest key possible (shadowless, even lighting), while a separate scheme, programmed to light the subject in the manner that suits the scene dramatically, can also be captured. By compositing the two renderings, a clean key that also maintains the cinematographers preferred lighting on the subject can be achieved for a realistic, natural look. In one embodiment, the cinematographer sets up the lighting scheme for the green or blue screen to capture the optimal matte. The blue or green screen gets the best matte when the colored background is well lit in the color. The subject in contrast needs to be well lit in white for optimal separation of the matte from the subject. Bleed is when colored light from the background reflects off the subject cause a hole in the matte. So lighting the subject well with white light is important for a clean continuous matte. Once the scheme for a good matte is setup the next scheme can be setup for lighting the subject. The matte can be completely turned off at that point. It also no longer needs colored light. In the second scheme it is possible to use very dim light for a chiaroscuro effect or similar high contrast effect. When the two schemes are captured back to back in the video the next step is to use the matte from the scheme 1 (optimized for matte definition) combined with the subject lighting of scheme 2. This is a straight forward post production operation where the matte area of scheme 1 is overlayed on the subject of scheme 2. It is possible to setup multiple schemes for the matte capture and multiple schemes for the subject capture. With 2 color backlight it is also possible to capture a blue background version and a green background version. All of this can be filmed in one multi-scheme video shoot using the invention. This approach can enable very difficult soft and low lighting of the subject while still having a clean matte.

DMX and RDM Real Time Control of VALT Tracks

DMX and RDM are widely accepted standards in film and studio lighting that allow for dynamic changing of the lighting on set. A "board operator" working from a lighting control console can control all lights on the set using this simple serial communication protocol. Each light has a specific DMX/RDM address or addresses if multiple control values are needed per fixture. RDM is a bi-directional enhancement to the uni-directional DMX protocol. Both DMX and RDM are cross compatible. For this discussion we will assume the simpler DMX protocol where there is a "talker" (the DMX control console) and "listeners" (the light fixtures). The data sent is very simple—an address followed by a value. The fixture will listen for its address or addresses and then accept the value that follows as its new setting. A VALT enabled LED light fixture could be configured with a separate DMX address and memory locations that stores the last setting for each track. An example table is shown in Table 1:

TABLE 1

| Single VALT Lamp DMX Addresses | 121 Track 1 | 122 Track 2 | 123 Track 3 | 124 Track 4 |
|---|---|---|---|---|
| | 90% | 0% | 50% | 100% |

The VALT video feeds could be played on separate monitors real time (4 monitors for 4 VALT tracks). Each would show a distinct lighting setup as seen by the camera. It would be possible for the board operator using the DMX console to adjust lighting of each track real time, watching the monitors. For example a spot light could be dimmed and increased in brightness real time on just on track without effecting the others using the DMX address for that track. The VALT lighting system preferably reads the values stored in each DMX address in real time. If these values were changed since the last frame it would preferably be updated with the latest value. This is a significant improvement over the original fixed static values for each track even though that method is also still viable and useful.

In film and broadcast lighting there are frequently times when dynamic lighting is used as a special effect, editing element or to simulate an environment in the film. Some effects require high speed adjustments to the light. Here are some examples:

Simple fade to black—at the end of a scene the lights dim.

Lightning, camera flash or Gun Shot—This can be a single frame strobe or a strobe lasting for multiple frames. A sequence of pulses may be desired. In the case of lightning it can be a preprogrammed sequence at different brightness levels.

Night—car driving by, flashing sign in window, street light flicker—All common effects used in film that can be simulated in a studio by projected light thru a window. By controlling one or more lights the effect of light moving or changing intensity or distance can be portrayed.

Fire, candle and lantern light—to simulate this type of light source a subtle, randomly changing level of light is needed. This sequence can also be programmed thru DMX.

VALT lighting systems have the benefit of being synchronized to the start of the frame. Therefore a DMX command typically will not be implemented mid frame. This avoids the undesirable effect of half bright/half dark frames. With progressive scan video this can result in the top of the frame having a different exposure than the bottom which can create a hardline in the middle of the frame. Even if only one track is being filmed there is benefit to using VALT so all lighting commands coming over DMX are synchronized and changed during the closed shutter angle time slot. All frames have constant lighting with all changings occurring during the off shutter time. This also enables higher speed effects such as single frame gun shot or paparazzi flash, which cannot be reliably done without synchronizing lighting to the shutter. VALT further enables the ability to try multiple lighting effects simultaneously—each version on a different track. For example, one fire effect may be very harsh with high and low extremes in contrast. Another track may use less severe contrast.

A more advanced method of implementing VALT uses time stamped frames. The industry standard for synchronizing frames is SMPTE (Society of Motion Picture and Television Engineers) time stamps that are correlated to each "plate". A "plate" is the term that described a predetermined background which often includes lighting and camera position defined per frame within a fixed sequence of frames. Each plate is designated by a time stamp which is correlated to the time stamped frames that are filmed. The location of the camera, lighting and subjects can be established for each time stamped frame. This is commonly used in green screen production. For example the background could have a battle going on with an explosion that occurs on a specific time stamped frame in a specific location. The change in lighting of the background needs to be reflected real time on the actors being filmed in the studio in front of the green screen. For each plate there is a designated SMPTE time stamp. During filming the SMPTE standard can be used to synchronize the filming and lighting of each frame to match each plate—thus simulating the same location, camera angle and lighting conditions by frame. Digital systems can control moving cameras and lighting to replay the exact sequence each take so the new filming perfecting matches the original plate sequence. Other examples are actors driving in cars where the background changes, action scenes, and animated backgrounds.

By incorporating the SMPTE time stamp with VALT technology it is possible to create multiple lighting sequences, one for each track that corresponds exactly to the designated plate. This can incorporate a moving camera as well. So for each plate VALT can enable several tracks of different lighting preferences. It also enables lighting of the subject on one track and then lighting for matte capture with green screen in a simultaneous track with both synchronized to the SMPTE time stamp plate location and desired lighting.

Self Compensating Dynamic Lighting for Video Active Lighting Tracks

As described above, the shutter angle (commonly 180 degrees) divides each frame into "camera on" and "camera off" time slices. At a shutter angle of 180 degrees this equals 50% camera on, 50% camera off. It is preferable to avoid a 24 FPS (frames per second) strobe appearance if one track has certain lights on—and these same lights are off for the remaining tracks. This will appear as a 24 FPS strobe which will be unacceptable, and very visible to actors and crew. It is possible for the lighting system to self-compensate for this effect by intelligently display the inverse of the "camera on" state in the "camera off state". Therefore if a light is on in the camera on state it is turned off in the camera off state. The same light in the next track if it is off in the camera on state it would be turned on in the camera off state. The result, assuming a 180 degree shutter angle, is all lights would be on for a net 50% of the time. The same algorithm can be applied to dim levels. If the light is on at an 80% level during the camera on state, then the light would be dimmed to a 20% level in the camera off state. If the light is 50% on for a track in the camera on state it would also be on at a 50% level in the camera off state. The mathematical result is the average light over the entire time slices of camera on and camera off will equal 50%. The settings of the VALT camera on state for each track is used to calculate the amount of remaining light required in the camera off state to achieve the net 50% on for the entire period of camera on plus camera off cycle. The eye will be unable to determine the fine time slices that move the timing and intensity of the various pulses between the camera on state and the camera off state that combine to create the average light level. In this way it will be possible to have all active lights on set appear to be constantly on at a 50% level even though they change level and which lights are on for every active lighting track.

Other mathematical methods can be used to calculate a light averaging scheme that can balance the optical light of each track that is seen during the "off camera" time with the selected tracks "camera on" lighting settings. Again the goal is to balance the average optical light seen by actors over time with the VALT lighting used by each track for image capture during the "camera on" time. Since the eye does not see transitions at >60 Hz, as long as the total light output is balanced in time slices of <1/60 sec then it will not be visible and will provide a reasonable working environment without distracting strobe appearance on set during filming. In this way the "camera off" time provides a second extremely valuable function; not only is it preferably used to transition the lights while the camera shutter is closed so no artifacts are captured, but it also can be used to balance the optical light and the "camera on" light settings to avoid visible strobing effects. The mathematical averaging preferably takes into account all VALT track settings such that the average optical light output is managed over the entire VALT sequence.

Anti-Flicker Compensation

Strong visual flicker occurs when a light is pulsed at a frequency of less than approximately 60 Hz. During the transition from 60-90 Hz flicker becomes less apparent, and is finally invisible at greater than approximately 90 Hz. The perception of flicker does vary slightly between individuals. Starting at 60 Hz and improving with higher frequencies the "persistence of vision" means the ability to distinguish high speed pulses of light is reduced, and the viewer will see the light as the equivalent of the average light emission over time. So, for example, a 96 Hz light pulse that is on for 50% of the time and off for 50% of the time will be seen to the eye as a constant light that is on at a light level that is 50% of the pulse light level.

The challenge when working with video capture is that the standard frame rate is generally 24 FPS, with some television being captured at 30 FPS. These speeds are well below the limit of persistence of vision. Even if four separate video tracks are captured while filming at 96 FPS, different light levels for each track will produce a VERY visible and distracting flicker without some method of compensation.

VALT can be run at various speeds based on the capabilities of the camera and lighting. VALT systems operate using a 96 FPS shutter rate or higher will have no visual flicker. 72 FPS is also a good speed, capable of capturing 3 VALT tracks at 24 FPS each. Higher speeds are also possible. The most common speeds are likely to be multiples of 24 FPS due to the widespread use of 24 FPS for film and television. Examples at 24 FPS for each VALT track are 48 FPS—2 VALT tracks, 72 FPS—3 VALT tracks, 96 FPS—4 VALT tracks, 120 FPS—5 VALT tracks, etc. 96 FPS is a preferred frequency, because it insures that each VALT track is higher frequency than 90 Hz, so that any recurring lighting setting that is properly compensated is well above the 60 Hz persistence limit for flicker.

The light output is preferably divided into two balanced pulses. The initial pulse (Shutter Open) is set by the user for use by the camera. The second pulse (Shutter Closed) is used for an "anti-flicker pulse". It is calculated by the VALT system and requires no intervention by the user. These two pulses correspond to the opening and closing of the shutter of the digital camera capturing the video. For the Shutter Open pulse the light level is preferably set by the user. The digital camera shutter is open during this pulse and captures the image using the appropriate light settings for each fixture. Because the shutter is closed for the Shutter Closed pulse, this pulse is visual light only preferably used for anti-flicker compensation. An inverse light pulse is calculated by the VALT system to compensate for the Shutter Open light pulse. This anti-flicker compensation pulse is averaged in the human eye with the Shutter Open pulse to create the total perceived light. Thus the anti-flicker Shutter Closed pulse can be used to equalize the light over the combined Shutter Open and Shutter Closed times, resulting in the appearance of a steady light without any flicker. This anti-flicker compensation thus balances whatever light is emitted during the Shutter Open pulse with an inverse light state during the Shutter Closed pulse.

For movies and television the most common shutter angle setting is 180 degrees. This is equivalent to Shutter Open for 50% of the FPS cycle and Shutter Closed for 50% of the FPS cycle. In this case if light 1 is 100% on for Shutter Open (camera) then anti-flicker Compensation would calculate 0% light as the correct Shutter Closed pulse, to make the average light output seen by the eye to be 50%. If in the next VALT frame the light level changes to OFF (0%) during the Shutter Open (camera) pulse then the anti-flicker pulse would generate an 100% ON pulse in the Shutter Closed state, so the resulting visual appearance is again 50% light output over the entire Shutter Open and Shutter Closed pulses. In the case of 96 FPS, the result would be 4 tracks where the light output would always visually appear to be 50% despite the actual light levels seen by the camera to be any number. This results in the ability of the user to set any light to any level without the resulting variation being noticeable to the human eye. All lighting changes are preferably made at a frequency that is higher than human vision can distinguish, and synchronized with the camera shutter. The anti-flicker compensation pulses are all preferably synchronized with the closed shutter time so they have no impact on the tracks being filmed while still providing the visual appearance of uniform light output to those on set.

With proper anti-flicker compensation all lights on set preferably have the appearance of being constantly on with an approximately 50% light level, independent of the light settings for each VALT track. This method of compensation provides the Director of Photography complete freedom to change and adjust the lights for each VALT track individually without any concern of creating a visual strobe effect. This anti-flicker compensation is completely automatic and requires no manual intervention or adjustment. The table in FIG. 5 shows an example of a simple 4 track/4 light VALT setup with calculations for anti-flicker compensation. A careful review of the table shows that all lights are compensated to appear 50% on at all times regardless of individual track settings. This algorithm also supports full 0-100% dim levels for all lights, not just on and off.

The transition of the LED lights from one state to the other will require some length of time. For cameras with "global shutters" some overlap of the LED transition during the Shutter Open time may create strong visual artifacts, but with any rolling shutter system (digital or mechanical) the transition of the LED lights is preferably completed during the shutter off time. Thus in order to support strobe compensation there are preferably two lighting transitions during the shutter off time. One transition changes the LEDs to the anti-flicker compensation level, and the other changes the light to the next VALT track Shutter Open state. Any latency in these transitions will limit the amount of compensation that can be accomplished during the Shutter Close state. By compensating (i.e. adjusting down) the 100% maximum light allowed during the shutter on state we can maintain the ability to accurately compensate for the strobe effect. The amount of compensation depends completely on the speed and latency of the LED switching system. High speed switching will limit the need for this compensation, but it needs to be considered for any system.

Another method of compensation for the LED transition time is to adjust the shutter angle. Because the light is preferably kept stable during the shutter open time, three events preferably occur during the shutter closed time: the light transition from the VALT settings used during shutter on to the anti-flicker light level, the sustained pulse for flicker compensation, and the transition to the next VALT track light level while the shutter is still closed. If the shutter open and shutter closed time is equal it is very difficult to perform all 3 of these tasks and balance anti-flicker. So by adjusting the shutter angle so the shutter is open less time (for example 40% of VALT cycle) and the shutter is closed for a longer time (for this example 60% of the VALT cycle) it is possible to better balance the shutter on and shutter off time for more effective ant-flicker compensation. Reducing the shutter angle of the Shutter Open time provides a longer shutter closed time for the 2 LED transitions that preferably occur during the shutter closed time. For example, if both the LED transitions together require 25% of the VALT frame (25%*360 degrees=90 degrees), the 90 degrees should be subtracted from the shutter open time and added to the shutter closed time. The shutter angle is preferably thus adjusted to 135 degrees (Shutter Open) and 225 degrees (Shutter Closed). This gives the Shutter Closed pulse 90 additional degrees to accommodate the LED transitions. FIG. 6 is a table showing a different mathematical method for making the 100% light level compensation for LED transition adjustment assuming a constant 180 degree shutter angle by adjusting the maximum light levels. Either way (adjusting the shutter angle timing or adjusting the light levels) may be used to compensate for LED transition times.

VALT Light Fixtures, DMX Addressing, and VALT Commands

LED light fixtures for use with the present invention preferably comprise a switching speed of 2 milliseconds or less, which enables transitions to different light levels to be fast enough so that anti-flicker compensation will work. A switching speed of 5 milliseconds or less will work, but has a greater chance of providing a visible strobing effect. This switching speed is preferably achievable for both the turn on ramp (from 0% to 100%) as well as the turn off ramp (100% to 0%), which ramp speeds are typically different based on the architecture of drive electronics. The light fixtures also preferably can receive and store multiple VALT states. For a 92 FPS VALT system running 4 tracks, four VALT lighting states are preferably stored per light fixture. A common way to accomplish this is through DMX addresses, with one address per VALT track per fixture (as shown in Table 2 below), which can be implemented by a central lighting control system or directly inside each fixture. Based on the desired lighting setting, each light fixture preferably automatically generates the proper light pulse for anti-flicker compensation. The appropriate calculation can be made by a central lighting control system and/or directly in each light fixture. The light fixtures can preferably receive and time light transitions based on an incoming camera synchronization signal. This sync signal preferably corresponds to the camera shutter opening and shutter closing and can be a simple digital clock signal or a more complex digital data packet, like those used for SMPTE HD television data. There are existing camera synchronization signals and standards in the industry, but previous lighting fixtures do not understand these data signals. VALT light fixtures preferably either understand these signals or are controlled by an external lighting control system that understands and synchronizes the lighting transitions to these sync signals.

LED light fixtures for use with the present invention also preferably can receive and execute VALT control commands. In the DMX example the control commands could be mapped to a shared DMX address that can be read by all lights on the system. Lighting control can be done at the fixture level or thru a centralized lighting control system that directly controls each light. Two example commands are:

1) Steady State/Preview. The argument is preferably the track number. In this mode the light preferably acts like a normal steady state DMX light, responding to regular DMX commands to the selected track DMX address. The command preferably specifies which track DMX address is to be used for steady state (for example, Track 1, Track 2, Track 3, or Track 4). In this mode the light ignores the camera sync signal. This command allows users to see and set up each VALT track separately like they would using conventional steady state lighting. This mode also allows VALT lights to be used as conventional studio lights as well.

2) Play VALT. This command resets all lights to VALT track 1 and starts the VALT sequence synchronized to the incoming sync signal. The lights will continue to cycle thru the VALT sequence until the camera sync signal stops or when the light receives the steady state command.

The industry standard for adjusting lights is DMX control boards. The present invention can utilize DMX addressing and command standards to support VALT. A standard DMX control board can be used to control the individual lights and setup for each VALT track in the same way it is used today. VALT Lights preferably comprise embedded memory for each VALT state. This enables the DMX board to treat each light as separate lights, one for each VALT track. The dim levels can be completely different for each track and set to any level 0-100%. Anti-flicker compensation preferably enables the lights to look like they are on at about 50% power during a shoot. Table 2 shows an example of a VALT light fixture DMX address scheme.

TABLE 2

DMX Address Examples

|  | TRACK 1 | TRACK 2 | TRACK 3 | TRACK 4 | CONTROL |
|---|---|---|---|---|---|
| Light 1 | 101 | 201 | 301 | 401 | 199 |
| Light 2 | 102 | 202 | 302 | 402 | 199 |
| Light 3 | 103 | 203 | 303 | 403 | 199 |
| Light 4 | 104 | 204 | 304 | 404 | 199 |

In this example there is a DMX Control address specified. This allows all lights, and even cameras and control panels on the system, to view and share the VALT commands system wide.

A more advanced VALT implementation can include more commands. These commands can include settings allow for more variations in the VALT settings. These settings can be shared over a network between all of the light fixtures, cameras and control systems being used in a specific studio setup. Examples of advanced commands include:

| Shutter angle | 0-360 degrees |
|---|---|
| Number of VALT Tracks | 2-12 tracks |
| Frames per Second | 24 to 1,000 FPS |
| ISO Speed | |
| Other camera and lighting controls | |

VALT Enabled Cameras

VALT enabled cameras are preferably used with systems of the present invention, since the camera display or eye piece can display specific VALT tracks during filming, and no post processing of the video recordings is necessary, which would ordinarily be required in order to separate the VALT video tracks that form the single track recorded by a non-VALT camera. Such VALT enabled cameras are preferably high speed, 60 FPS or greater, and can serve as either the network master (generating the sync signal for all lights and other cameras on the system), or a slave, following the sync signal generated by a system controller. Camera sync is common in the TV and film industries. The common signals used are black burst and tri-level sync, which are available on most high end cameras. Multiple cameras may film simultaneously using VALT when they share a sync signal. VALT cameras preferably read and respond to VALT commands, and optionally issue VALT commands as well, making it possible at the camera to switch from Steady State/Preview into Play mode. Other commands enable camera settings to be downloaded and compensated for by the VALT lighting systems on the network. VALT cameras can preferably display separate VALT tracks by track number, and switch between them, on the camera monitor or digital eyepiece. Because VALT tracks are interleaved, the camera preferably can intelligently collate and extract each VALT track into separate video streams. The cameraman can preferably select which VALT track he wants to see on the camera and switch between viewing tracks as desired. A VALT camera also preferably records and stores VALT video streams or tracks separately rather than storing them as a single video file. An optimal VALT camera separates the video out into separate files and video feeds recorded during each shoot. This is one way to enable immediately playback of each separate VALT track on camera.

VALT enabled camera(s) combined with VALT enabled lights, using a standard DMX console, are sufficient to support VALT filming. The sync signal from the VALT camera is preferably fed directly to the VALT lights. Since any DMX console can send the DMX light levels and DMX commands to the lights, there is no need for a custom console. All lights levels, adjustments, Steady State and Play VALT commands can be generated and sent to the lights easily on a standard DMX console. This system assumes the VALT Camera separates the VALT tracks into separate video streams that are preferably viewed on separate monitors to view each track during filming and for playback.

Alternatively, a system comprising a separate VALT control system may be beneficial. A VALT control system preferably separates VALT tracks from a single high speed video output stream from a camera for previewing and recording as separate video files. This is a very simple process where the interleaved frames are separated into individual VALT Track video files. This capability enables real time viewing of all VALT tracks, recording of separate VALT tracks, and playback of VALT tracks. A VALT DMX console or control panel may be structured to comprise push button VALT commands, and organize lighting controls by VALT track. A VALT control box can control "dumb" high speed light fixtures by issuing all lighting commands in real time, direct to each fixture. A VALT control console preferably reads the camera sync and/or HD video data and generates the simple sync data required for the lights. In this way a standard camera with industry SMPTE output can link to the VALT Control System, and the system can synchronize the light transitions.

Figure 7:
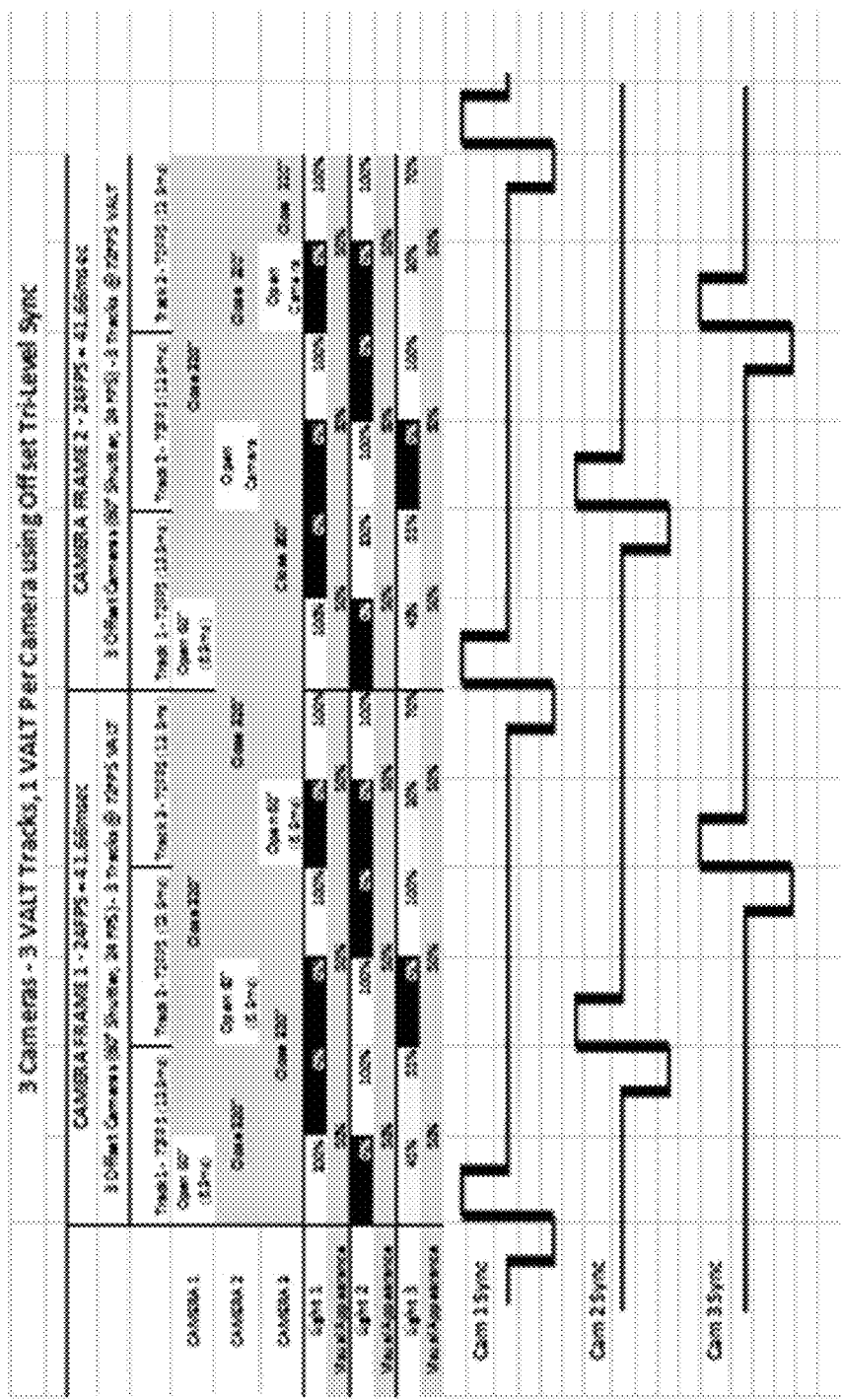
FIG. 7 is a schematic showing three cameras capturing a VALT recording using offset Tri-Level Sync.
Figure 8:
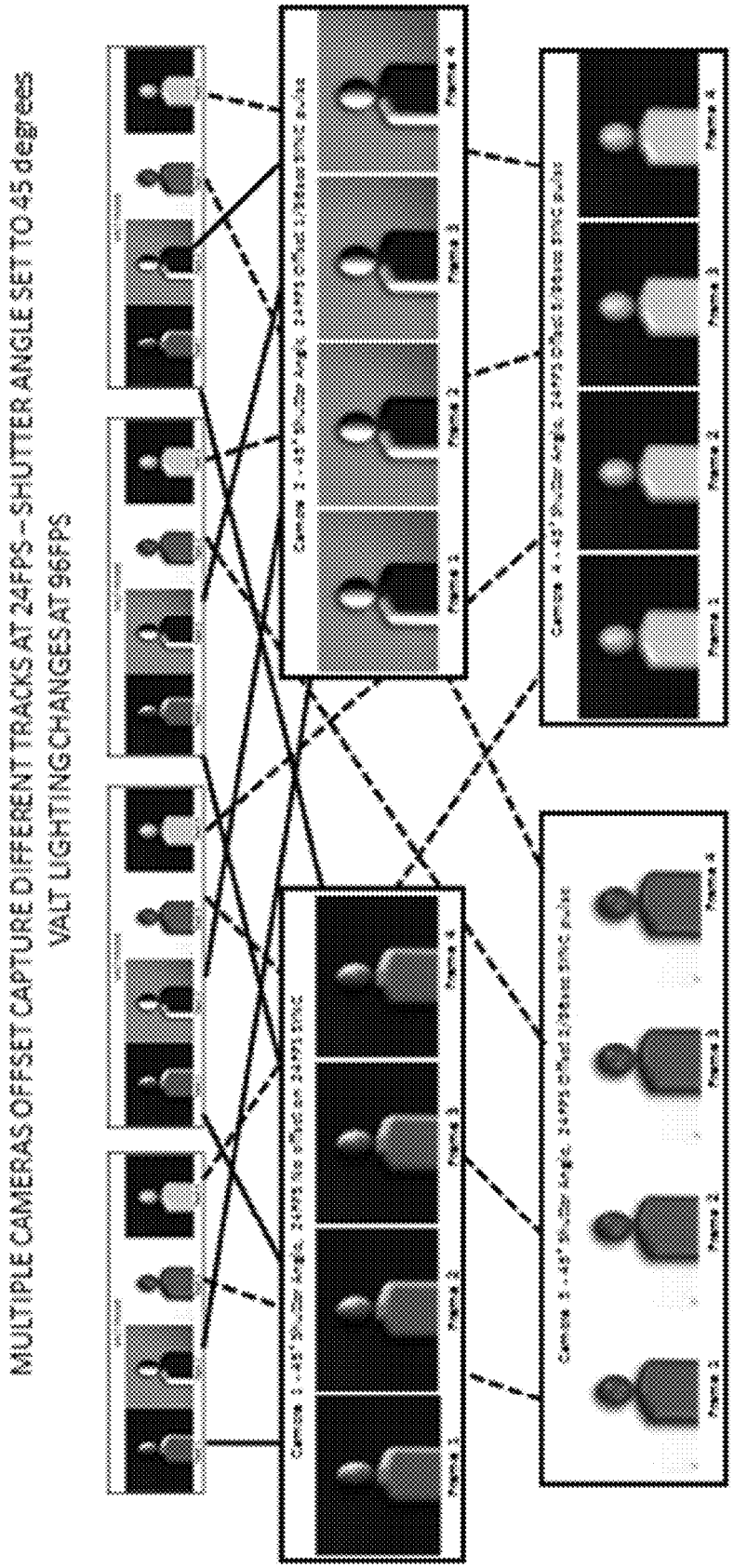
FIG. 8 is a schematic of how separate cameras can be used to duplicate the VALT recording shown in FIG. 1.

It is also possible to use VALT lighting with standard cameras that are synchronized to the VALT lighting system. This is done by setting each camera to its standard frame rate (for example 24 FPS) and then running VALT at multiple times that frame rate (in this example 3 cameras×24 FPS=72 FPS VALT for three tracks). The next step is to adjust the shutter angle of each camera so it is only open for the short burst that coincides with the individual VALT tracks. In this example of three cameras the camera shutter angle is reduced by 3×=180 degrees/3=60 degree camera shutter angle. By offsetting the sync signal to each camera, they can each capture a separate VALT track. The offset of each camera in this example is camera 1—no offset, camera 2=1/3 frame, camera 3=2/3 frame. This example could be used for the common three angle shot used in conversations. One camera films a couple talking in a shot that shows both individuals. Camera 2 is an over-the-shoulder shot of actor 1. Camera 3 is an over-the-shoulder shot of actor 2. In this way the entire conversation and individual reactions of the actors is captured. Today this is generally filmed in three takes, with lighting changing for each take. With VALT and three cameras, all three shots could be filmed at the same time, each with its own optimized lighting. Another advantage of the separate camera approach is each camera is recording only a single VALT track, so no post processing or signal splitting is needed to view the video real time. Each camera sees what is being captured in its respective VALT track. In one such example, the VALT Lighting is synchronized to 72 FPS, with each camera set to 24 FPS. This allows for three VALT tracks to be sequenced per frame camera (72 FPS VALT/24 FPS CAMERA). The cameras preferably support shutter angle adjustment. The shutter angle of each camera is then preferably adjusted to SHUTTER ANGLE=180 degrees/(VALT FPS/CAMERA FPS), or in this example 60 degrees. A VALT signal generator provides up to three separate 24 FPS sync signals, preferably industry standard sync signals (like BlackBurst or Tri-Level Sync). Each sync signal is offset to match the VALT track that each camera is selected to film. In this way each camera can be selected to film using any VALT track lighting simply by using the proper sync offset. FIG. 7 shows a schematic of this example. FIG. 8 is a schematic of how separate cameras can be used to duplicate the VALT recording shown in FIG. 1.

Use of the Global Positioning System (GPS) in Synchronized Lighting

For lighting that needs to be synchronized to other lighting and to other systems, such as for studio lights that are synchronized to cameras and recording equipment, a wireless option is the use of GPS receivers. GPS modules are now available in low cost chip sets that can be integrated into the control electronics of a single light or of a lighting control system. By adding GPS as the wireless synchronization clock generator to VALT synchronized lighting, lighting capabilities are enhanced with higher precision and additional absolute time and location information all supported by a wireless capability that makes setup much simpler. The advantages of a GPS based synchronization system for lighting are the following:

Accuracy—GPS signals are accurate to 12 nanoseconds. Even a poor receiver implementation can be accurate to within 100 nanoseconds. This time stamp resolution is 100,000 times greater than what is needed for simple shutter syncing. The level of GPS accuracy can be used for very high precision, high accuracy and high speed sync applications. Since GPS clocks are absolute time this also means there is never any drift or shift in timing between GPS enabled devices. Devices can be set very far apart without impacting their sync accuracy.

Absolute time—never out of phase. For sync applications like VALT that have a series of settings it is possible to designate an absolute time as the start of the sequence. For example VALT can have 4 tracks that are played in sequence. The camera(s) and every light on the network need to be in sync with respect to which VALT track is being played at any specific time. In one example the absolute time of the second interval (=HH.MM.SEC.0000000) can be used as the designated restarting time of the sequence. In this way all devices that are VALT enabled know where they are in the sequence (i.e. which VALT track) based on the offset from the absolute second time interval. Other time intervals may alternatively be used; in all cases, the time is preferably specified in absolute time that is shared by all synchronized devices, including lighting on the network.

Time Stamps. It is possible for every light and component on the system to have a time stamp and/or absolute time enabled start, transition and stop commands. Scripted sequences of lighting can be replayed and re-recorded over several takes with unerring accuracy. For example, a special effects sequence may have a series of explosions, gun shots and flashes that are timed to coincide with specific special effects. In this way filming of the action using multiple takes and editing can have the exact same lighting event timing, captured in the same sequence of time stamped frames for every take. The accuracy can be down to the exact frame in each sequence using absolute GPS time sync.

Location and auto-mapping. Upon installation each light will wirelessly know where it is installed. Using RDM or other wireless communications, each light can report its GPS location and a map can be automatically developed that shows each light's location and light identifier. If a light has a failure it can report its location for service.

Redundant internal crystal clock. High precision crystal clocks are preferably still included in every light. Because the light fixtures can lose their GPS signals due to interference, an independent clock is preferably always running in the light fixture or lighting controller. If there is a loss of GPS signal, the internal clock will continue to track absolute time using a high accuracy internal (preferably crystal) clock. In this way, even with an intermittent GPS signal from as few as 1-2 satellites, a light that has been installed with a known location will be able to keep the clock in sync with absolute time. During installation, four satellite signals are typically needed to establish location. However once location is established after installation, only one satellite signal is preferably needed to calculate and recalibrate absolute time.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for making a digital video, the method comprising:

synchronizing one or more light emitting diode (LED) light fixtures to the shutters of one or more digital cameras, wherein the one or more LED light fixtures are dimmable;

changing an intensity of the one or more lights while the shutter on each of the one or more cameras is closed;

turning on one or more of the lighting fixtures at a predetermined intensity while the camera shutters are closed so that personnel on set perceive light that is constantly on and flicker free;

reducing the time in each camera cycle when the shutter is open so there is sufficient time when the shutter is closed to accommodate a lighting transition from the intensity of the lighting while the shutter is open, an anti-flicker lighting pulse, and a lighting transition to the intensity of the lighting when the shutter is next open;

defining a plurality of n lighting schemes, each scheme comprising desired intensities of the one or more light fixtures;

switching the lighting fixtures sequentially between the lighting schemes in synchronization with the camera shutters at a rate equal to the frame capture rate of the cameras divided by n; and the cameras capturing the plurality of lighting schemes on interleaved video frames during a single video take, wherein every $n^{th}$ video frame captures a scene comprising the $n^{th}$ lighting scheme, wherein each camera is capable of capturing at least 47 frames per second (FPS).

2. A method for making a digital video, the method comprising:

synchronizing one or more light emitting diode (LED) light fixtures to the shutters of one or more digital cameras, wherein the one or more LED light fixtures are dimmable;

changing an intensity of the one or more lights while the shutter on each of the one or more cameras is closed;

compensating for lighting transition times by adjusting the maximum light levels;

defining a plurality of n lighting schemes, each scheme comprising desired intensities of the one or more light fixtures;

switching the lighting fixtures sequentially between the lighting schemes in synchronization with the camera shutters at a rate equal to the frame capture rate of the cameras divided by n; and the cameras capturing the plurality of lighting schemes on interleaved video frames during a single video take, wherein every $n^{th}$ video frame captures a scene comprising the $n^{th}$ lighting scheme, wherein each camera is capable of capturing at least 47 frames per second (FPS).

* * * * *